US007036466B2

(12) United States Patent
Goebel et al.

(10) Patent No.: US 7,036,466 B2
(45) Date of Patent: May 2, 2006

(54) THERMAL MANAGEMENT SYSTEM AND METHOD FOR VEHICLE ELECTROCHEMICAL ENGINE

(75) Inventors: Steven G. Goebel, Victor, NY (US); Gerald W. Fly, Geneseo, NY (US); Glenn William Skala, Churchville, NY (US); Lee Curtis Whitehead, Middleport, NY (US)

(73) Assignee: General Motors Corporation, Detroit, MI (US)

(*) Notice: Subject to any disclaimer, the term of this patent is extended or adjusted under 35 U.S.C. 154(b) by 38 days.

(21) Appl. No.: 10/797,671

(22) Filed: Mar. 10, 2004

(65) Prior Publication Data

US 2005/0199192 A1    Sep. 15, 2005

(51) Int. Cl.
*F01P 9/00* (2006.01)
(52) U.S. Cl. .................................. 123/41.01
(58) Field of Classification Search ............. 123/41.01, 123/41.07, 41.05
See application file for complete search history.

(56) References Cited

U.S. PATENT DOCUMENTS

| 4,098,236 A | * | 7/1978 | Okawa ..................... 123/41.02 |
| 4,686,942 A |   | 8/1987 | Hayashi et al. .......... 123/41.21 |
| 4,769,297 A |   | 9/1988 | Reiser et al. ................. 429/17 |
| 4,771,822 A | * | 9/1988 | Barbosa ........................ 165/41 |
| 4,795,683 A |   | 1/1989 | McElroy ....................... 429/13 |
| 5,101,775 A | * | 4/1992 | Hubbs ..................... 123/41.01 |
| 5,129,446 A | * | 7/1992 | Beamer ........................ 165/41 |
| 5,148,859 A | * | 9/1992 | Beamer ........................ 165/41 |
| 5,211,136 A | * | 5/1993 | Dacus et al. ............. 123/41.55 |
| 5,503,944 A |   | 4/1996 | Meyer et al. .................. 429/13 |
| 5,732,665 A | * | 3/1998 | Morrison ................. 123/41.01 |
| 6,117,577 A |   | 9/2000 | Wilson ......................... 429/17 |
| 6,195,999 B1 |   | 3/2001 | Arnold et al. ................ 60/649 |
| 6,298,809 B1 | * | 10/2001 | Boggs ..................... 123/41.15 |
| 6,321,830 B1 | * | 11/2001 | Steinmann .................... 165/41 |
| 6,360,835 B1 |   | 3/2002 | Skala ........................ 180/65.2 |
| 6,394,207 B1 |   | 5/2002 | Skala ........................ 180/65.2 |
| 6,432,568 B1 |   | 8/2002 | Salvador et al. .............. 429/19 |
| 6,443,253 B1 |   | 9/2002 | Whitehead et al. ........ 180/68.1 |
| 6,461,753 B1 |   | 10/2002 | Breault et al. ................ 429/26 |

OTHER PUBLICATIONS

"Graphite Foam Evaporatively Cooled Heat Sinks", Automative Propulsion Materials Program, Metal & Ceramics Division, Oak Ridge National Laboratory, Rev. May 2000, David P. Stinton.

(Continued)

*Primary Examiner*—Henry C. Yuen
*Assistant Examiner*—Jason Benton
(74) *Attorney, Agent, or Firm*—Cary W. Brooks

(57) ABSTRACT

A thermal management system of an electrochemical engine comprises a radiator provided with a wicking mechanism, a coolant pump fluidly connected to the radiator, a water tank, and a water pump. The water tank is located in the void spaces around fuel storage tanks, and may be filled directly or with reclaimed water from a vapor by-product of the electrochemical engine. The water pump is operable to supply water from the water tank to the wicking mechanism during peak power and/or hot day conditions. Moisture in the vapor by-product may be condensed with the excess cooling capacity of the radiator under less severe cooling conditions. Under freezing conditions, exhaust or coolant from the electrochemical engine may be used to unfreeze water in the tank and wicking mechanism supply lines.

27 Claims, 3 Drawing Sheets

OTHER PUBLICATIONS

"Efficient Fuel Cell Systems" by Christine Zawodzinski, Steffen Moller-Holst, and Mahlon S. Wilson, Materials Science and Technology Division of Los Alamos National Laboratory, 2000 DOE OTT Fuel Cells Program Review, Jun. 7-8, 2000.

Laboratories for the 21st Century: Case Studies, "The U.S. Environmental Protection Agency's National Vehicle and Fuel Emissions Laboratory, Ann Arbor, Michigan", Dec. 2002.

* cited by examiner

THERMAL MANAGEMENT SYSTEM AND METHOD FOR VEHICLE ELECTROCHEMICAL ENGINE

FIELD OF THE INVENTION

This invention relates to the field of thermal management and in particular, a thermal management system and method for an electrochemical engine used in a vehicle.

BACKGROUND OF THE INVENTION

Thermal management of an electrochemical engine presents several important considerations and challenges as compared to a conventional internal combustion engine. First, in an internal combustion engine, waste heat is managed about equally through both an exhaust gas stream and through a flow of air-cooled engine coolant. In comparison, an electrochemical engine manages most of its waste heat through air-cooled engine coolant. Second, an internal combustion engine typically operates at 120° C., where an electrochemical engine operates at the lower temperature of 80° C. Therefore, the heat transfer between the coolant and air in a thermal management system of an electrochemical engine is about one-half that of an internal combustion engine due to the smaller temperature differential between the waste heat and ambient at 38° C. These two considerations in combination may necessitate a threefold increase in the cooling airflow rate through the radiator and an order of magnitude increase in its associated fan power.

The cooling requirement has generally been met by placing a large radiator at the front of the vehicle. However, due to the current size of the radiator, vehicle style has been strongly driven by the high rate of airflow required for cooling. Although some reduction of heat rejection requirements is achieved through higher thermodynamic efficiencies of the electrochemical engine, there is a continued need for creative cooling solutions for vehicle applications where space is limited.

SUMMARY OF THE INVENTION

This invention greatly reduces the required cooling airflow rate by including the heat of water vaporization. The reduced airflow rate is accommodated in a much smaller, and therefore more easily packaged radiator by including evaporative cooling.

In one embodiment, a method of managing heat from an engine for a vehicle is provided. The method comprises providing airflow over a surface of a heat exchanger circulating coolant used to cool the engine. The airflow is used to reject heat from the heat exchanger. The method further includes wicking water over the heat exchanger to supplement the cooling capacity of the airflow by evaporative cooling.

In another embodiment, a thermal management system of an engine for a vehicle is provided. The system comprises a coolant pump, a radiator comprising a wicking mechanism and an associated fan to provide airflow over the wicking mechanism. The system includes a coolant circuit circulating coolant used to cool the engine. The coolant circuit fluidly connects the engine, the coolant pump, and radiator. A supply of water is in fluid connection with the wicking mechanism to supplement the cooling capacity of the airflow by evaporative cooling.

These and other features and advantages of the invention will be more fully understood from the following description of preferred embodiments of the invention taken together with the accompanying drawings. It is noted that the scope of the claims is defined by the recitations therein and not by the specific discussion of features and advantages set forth in the present description.

BRIEF DESCRIPTION OF THE FIGURES

The following detailed description of the embodiments of the present invention can be best understood when read in conjunction with the following drawings, where like structure is indicated with like reference numerals and in which.

DETIALED DESCRIPTION OF THE EMBODIMENTS OF THE INVENTION

Figure 1:
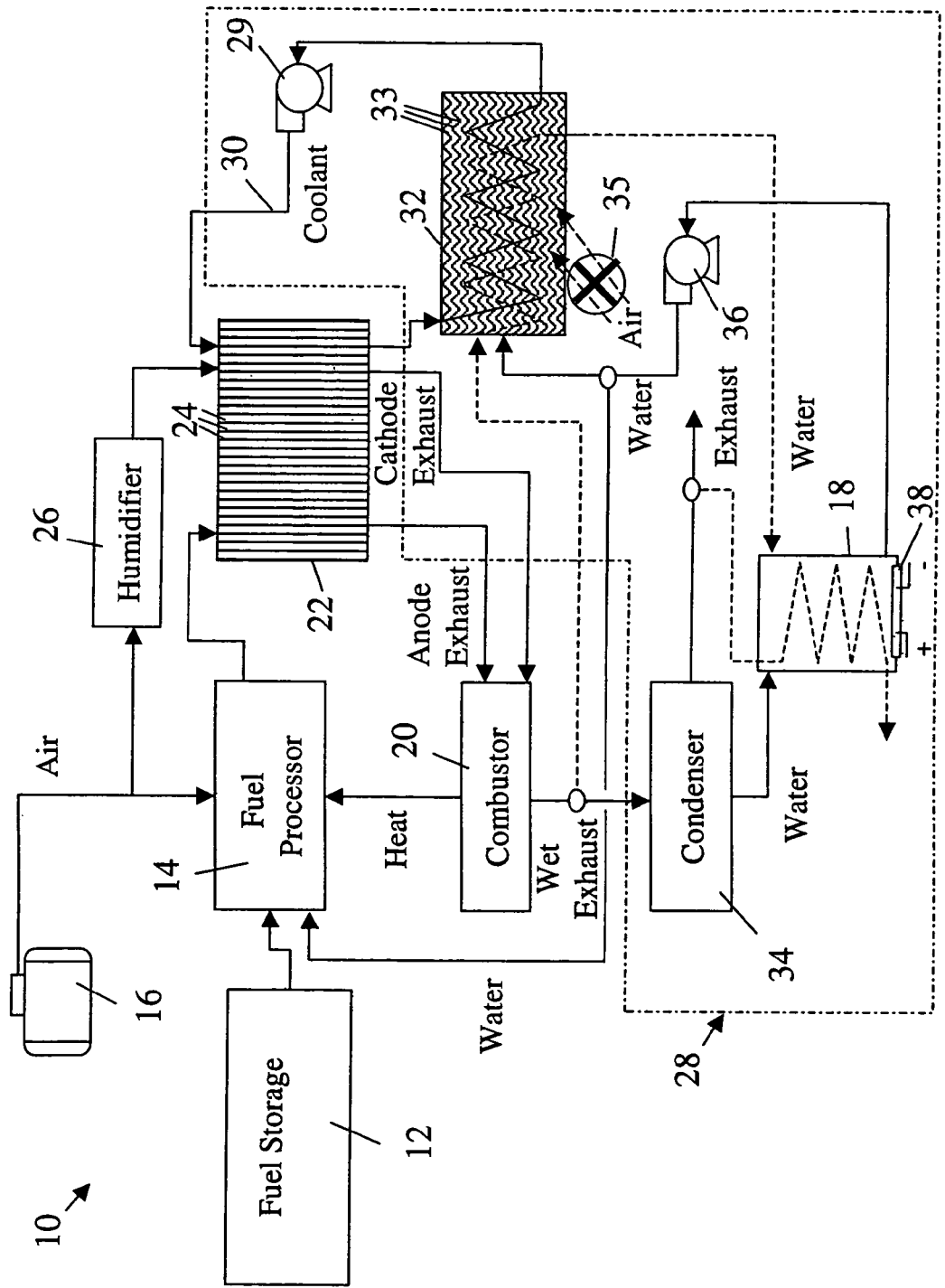
FIG. 1 is a schematic layout depicting an engine embodying the present invention.

With reference to FIG. 1, an engine is generally indicated by symbol 10. In one embodiment, the engine 10 is an electrochemical engine (ECE), which operates to generate electricity in a fuel cell stack given two reactants, e.g., a hydrogenous gas and a gas containing oxygen. Hydrogenous gases for the fuel cell stack may be produced on board the vehicle and this method is described hereinafter; however, the present invention is not limited to such a system. In another embodiment, the engine 10 is a conventional internal combustion (IC) engine for vehicles that have limited radiator space.

In the illustrated embodiment, a liquid fuel, such as gasoline, diesel, methanol, etc., is stored on board the vehicle in a fuel tank 12. The fuel is supplied to a fuel processor 14 in the ECE 10. The fuel processor 14 may also receive compressed air from an air compressor 16 for partial oxidation and water, if available, from a water tank 18 for steam reformation. A combustor 20 generates and supplies heat to the fuel processor 14, wherein the fuel processor partially oxidizes and reforms the fuel to produce a hydrogen-containing reformate. If water is available, the fuel processor 14 steam reforms a portion of the fuel to produce additional hydrogen. Having water present also reduces the likelihood that methane and solid by-products such as soot and carbon are created.

To reduce residual carbon monoxide in the reformate, the fuel processor 14 may further include one or more carbon monoxide reduction reactors where the residual carbon monoxide is combined with water to produce carbon dioxide and hydrogen. The fuel processor 14 may further include a carbon monoxide cleanup reactor where the residual carbon monoxide is oxidized using air from the air compressor 16. The reformate also may be passed through a cooler, if cooling is necessary before the reformate is delivered to a fuel cell stack 22.

To generate electricity in the fuel cell stack 22, the hydrogen-containing reformate is delivered under pressure to the stack. The fuel cell stack 22 contains a series of individual bipolar fuel cell plates 24, as is known in the art. The hydrogen-containing gas is fed through an anode, not shown, to create positively charged hydrogen ions. Concurrently the air compressor 16 and an optional cathode humidifier 26 provide a humidified oxidant supply to a cathode, not shown, of the fuel cell plates 24. The cathode is separated from the anode by an electrolyte. If a humidifier 26 is used, it may receive water from the water tank 18. Electricity is generated in the fuel cell stack 22 by electrochemically processing the hydrogen and oxygen in a manner known in the art. The generated electricity may power a drive system and auxiliary vehicle devices.

As an alternative to reforming hydrogen on-board as described above, hydrogen for the electrochemical process may be stored on-board the vehicle in a suitable storage tank. The hydrogen may be stored either in its gaseous state, liquid state, or in a captured solid state by a hydrogen-retention material contained within the storage tank. Hydrogen-retention material refers to a material, which is capable of reversibly taking-up and storing hydrogen at a storage temperature, and releasing it at a release temperature, which is greater than the storage temperature. Examples of hydrogen retention material include metals such as sodium-aluminum, lanthanum-nickelide, titanium, or nickel, which react with and store the hydrogen as a hydride of the metal.

Depending on the initial liquid fuel, the fuel cell stack 22 may exhaust methane, unconsumed hydrogen, carbon dioxide, nitrogen, and water from the anode and unconsumed oxygen, nitrogen, and water from the cathode. In addition to the above-described exhaust gases, the fuel cell stack 22 also generates heat. To manage the heat, the ECE 10 includes a thermal management system 28 comprising a coolant pump 29, a primary coolant circuit 30 to circulate low temperature engine coolant through the fuel cell stack 22, transferring waste heat out of the stack. The heated coolant is cooled through a heat exchanger, such as an air-cooled radiator 32, which may have an associated fan 35 to force air from an air duct (not shown) through the radiator. The thermal management system 28 further includes a condenser 34 for reclaiming water from the wet exhaust of the fuel cell stack 22, the water tank 18 for storing the reclaimed water, and a water pump 36.

Water is reclaimed in the ECE 10 by routing the exhaust streams from the fuel cell stack 22 through the combustor 20, which provides the dual function of consuming undesirable exhaust components and generating heat for the fuel processor 14. In one embodiment, the wet exhaust stream flowing out of the combustor 20 is directed through the condenser 34 to reclaim liquid water before finally being exhausted from the vehicle in one embodiment. In an alternative embodiment, the exhaust stream from the fuel cell stack 22 may be first routed through the condenser 34 and then to the combustor 20 before exiting the vehicle.

In still another embodiment, as a means for trying to keep the water tank 18 above freezing (i.e., >0° C.) to minimize the risk of potentially damaging the water pump 36, the exhaust or coolant may be operatively directed to flow through the water tank 18 when the temperature is around or below freezing. Additionally, the exhaust gas or coolant flow may be used to thaw critical portions of the water tank and supply lines under the sub-zero ambient conditions when the water tank 18 may have become frozen. As used herein, the terms "operatively directed" and "operatively directing" mean that an actuated value or other system connecting means is controlled by a controller monitoring internal and external conditions of the ECE 10 and effectuating the indicated system arrangement given the indicated (sensed) condition. As using controllers for this purpose is well know in the art, no further discussion is provided. Additionally, it is to be appreciated that in the embodiment using coolant, the coolant may be continuously directed to flow through the water tank 18 even when temperatures are above or below freezing.

Optionally, a small resistive element 38 may be provided either to the walls of the water tank 18 or through the walls to the water itself, where a small current may be drawn from a battery even when the ECE 10 is not operating to prevent the water in the tank from freezing. In still other embodiment, the conventional cooling capacity of the radiator 32 is sized to provide adequate heat rejection under these cold weather conditions such that water in tank 18 need not be stored, and the associated freeze challenges would be avoided.

To maintain sufficient water levels in tank 18, under normal operating conditions, and whenever the radiator 32 has additional cooling capacity, either a portion or all of the wet exhaust from the combustor may be operatively directed through the condenser 34 for condensing water and filling water tank 18 with reclaimed water. Such an arrangement would be beneficial where the water tank 18 is provided as a separate storage tank than that used to provide water to fuel processor 14 and/or humidifier 26. Optionally, the water tank 18 could also be refilled at the same interval, at the same time, and at the same filling station as the fuel tank 12.

Returning now to the discussion of the thermal management system 28, water is supplied in the following manner. From the water tank 18, the reclaimed water is pumped to the fuel processor 14 upon ECE start-up and during normal ECE operation to improve the engine efficiency, as processing the fuel with water releases more hydrogen than processing the fuel with only air. Optionally, and depending on the configuration of the fuel cell stack 22, water from the water tank 18 may also be operatively directed from the pump 36 to the humidifier 26 to humidify the air input to the anode and/or cathode.

Additionally, under peak power or hot day conditions when the cooling capacity of the radiator 32 is not sufficient, the reclaimed water is used to supplement the cooling capacity of the radiator by operatively directing water from the tank 18 to the radiator 32 via pump 36. It is to be appreciated that the cooling capacity of the airflow is increased by including evaporative cooling of water into the airflow. To ensure full utilization of the water for evaporative cooling, the reclaimed water is introduced through a wicking mechanism 33 disposed on the exterior surface of the radiator 32, and in particular on the fins. Suitable wicking mechanism 33, include but not limited to, capillary wicking structures such as for example fibers, felts, foams, weaves, and wicking materials, such as for example metals (preferred for thermal conductivity), polymers selected for hydrophilic surface properties or pyrolized organics with hydrophilic surface properties.

An alternate approach to enhance cooling, especially for the embodiments where the engine 10 is an IC engine, is to spray all or a portion of the water supplied by the pump 36 onto the radiator 32. In this alternative embodiment, cooling effectiveness of the radiator 32 is about 80–85%. Additionally, by using the wicking mechanism 33 as part of the radiator 32, water loss from droplets passing through the radiator is substantially avoided.

By evaporatively cooling the exterior surface of the radiator 32, the reclaimed water need not be as pure if used to evaporatively cool a fuel cell internally where ions could contaminate the membrane. Further, any scale deposits left by the evaporated water is more readily cleaned from the exposed surfaces of the radiator 32 than from the interior of the fuel cell stack 22.

Figure 2:
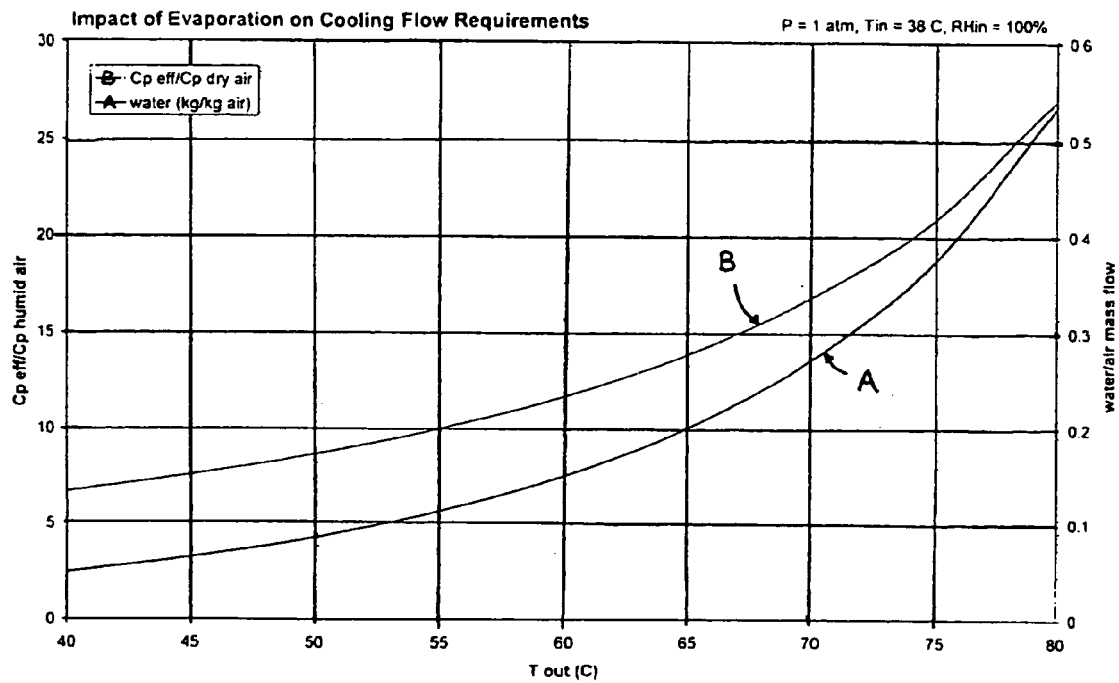
FIG. 2 is a graph of cooling effectiveness and quantity of water for evaporative cooling according to the present invention.

It is to be appreciated that the present invention significantly enhances the cooling capacity of the cooling air used to reject heat from an electrochemical engine by adding liquid water to the heat rejection device to utilize the heat of vaporization. FIG. 2 shows a graph illustrating the ratio of effective heat capacities with evaporative cooling to without evaporative cooling as illustrated by the line indicated by symbol B. The ratio of effective heat capacities being the heat rejection ratio for the same mass flow of air for the same temperature rise. The chart also provides the ratio of water to airflow on a mass basis as illustrated by the line indicated by symbol A. This calculation assumes that the air exiting the heat rejection device is saturated by water vapor at the temperature indicated. For example, at an exit temperature of 80° C., the effective heat capacity is about 27× larger (so 27× less cooling airflow is required), and a water flow of only 0.5 times the airflow is required.

Figure 3:
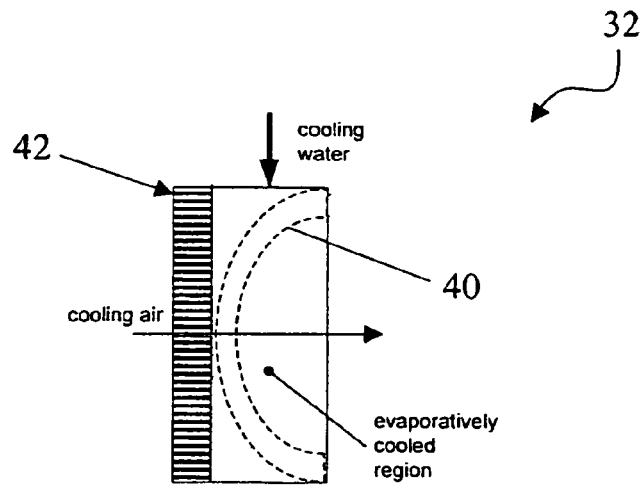
FIG. 3 is a schematic section view of a radiator with non-evaporative and evaporative cooling regions according to an embodiment of the present invention.

In the illustrative embodiment of FIG. 3, the radiator 32 comprises engine coolant passages 40, and fins 42 on the airside. In one embodiment, each fin 42 has or is the wicking mechanism 33, which is capable of wicking water provided from a water supply, such as water tank 18, over the heat rejection surface of the radiator 32. In another embodiment, and when ambient temperatures vary between sub-zero and warm weather conditions (i.e., >0° C.), for sub-zero operations a forward portion of fins 42 would not include the wicking mechanism 33 as the cold ambient temperatures would freeze the water used for evaporative cooling. In such an embodiment, after the cooling air warms above freezing as it passes through the forward portion of the radiator 32, evaporative cooling is then used in a warmer rearward portion of the fins and/or radiator having the wicking mechanism 33 to maximize the benefit of evaporative cooling on radiator size and cooling airflow requirements.

In still another embodiment, the radiator 32 has wicked cooling zones wherein water is operatively directed to forward and rearward wicking mechanism portions of the radiator 32 during warm weather conditions and to only the rear wicking mechanism portion during freezing weather conditions. The forward wicking mechanism portion comprises the wicking material and/or structure on the airside portion of the fins 42. The rearward wicking mechanism portion also comprises the wicking material and/or structure on the aft portion of the fins and/or radiator. The location of the rearward wicking mechanism is such that under normal operating condition of the electrochemical engine, the rearward wicking mechanism experiences above freezing temperatures due to heat transfer from the circulating coolant, even when the vehicle is subject to near freezing temperatures (i.e., 0 to 5° C.) and below. The forward and rearward wicking mechanism portions are supplied with water from the water tank 18 via pump 36, through separately controlled rewetting arteries.

It is to be appreciated that the quantity of water that needs to be stored will scale with the quantity of on-board fuel and engine efficiency (and exhaust heat rejection). The heat generation rate of the electrochemical engine is calculated by the following Equation (1):

$$Q = N*(1.25-V)*I \qquad (1)$$

where Q is the heat generated, N is the number of cells, V is the cell voltage, I is the cell current. For example, if all of the heat rejection is handled by water vaporization, for an average cell operation of 0.75 volts, the quantity of water that needs to be stored is 20× the mass of stored hydrogen as current is proportional to hydrogen flow.

Figure 4:
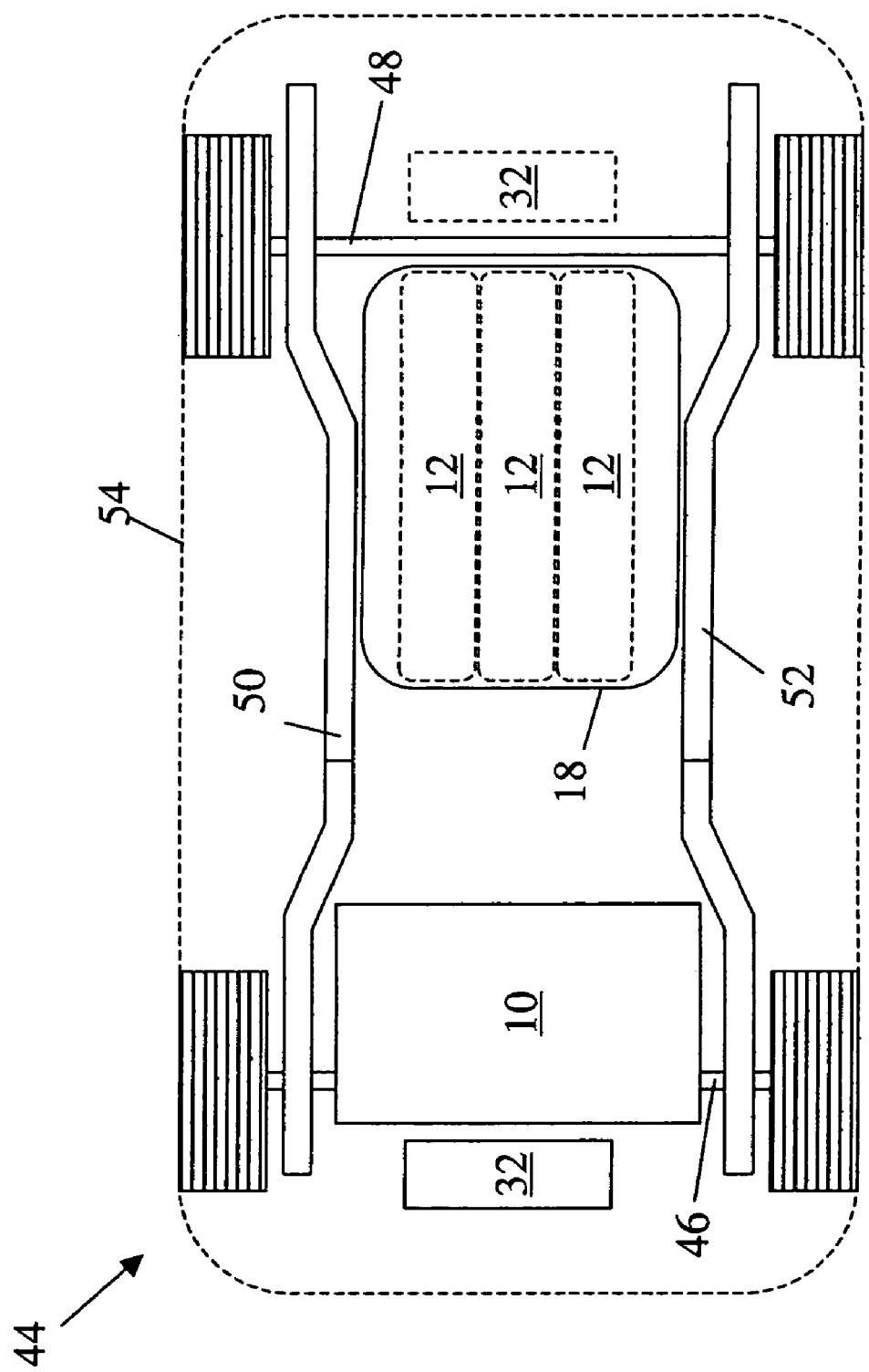
FIG. 4 is a schematic top view of a vehicle embodying an engine and associated thermal management system of the present invention.

Turning now to FIG. 4, a schematic plan view of a vehicle 44 embodying an electrochemical engine 10 with the associated radiator 32 located forward of a front axle 46 of the vehicle is illustrated. In an alternative embodiment, the radiator 32 may be located behind a rear axle 48 of the vehicle 44. Fuel is stored in the fuel tank(s) 12, shown here in the rear underbody compartment of the vehicle forward of the rear axle 48 of the vehicle 44. The rear underbody compartment is defined by the volume between frame rails 50, 52 forward of the rear axle 48 and below the vehicle floor 54.

In the illustrated embodiment, the water tank(s) 18 enclose the fuel tank(s) 12 to utilize the void spaces associated with the fuel tank(s). For example, in the embodiment where storage hydrogen is used, it is to be appreciated that the storage of hydrogen for vehicles is generally accomplished by storing hydrogen as compressed gas in high-pressure cylinders. Accordingly, the volume around these cylinders is of an odd shape and generally not useful for other components. In such an embodiment, adequate evaporative cooling water could be stored in these void spaces, by for example, using cylinders having a 30-liter internal volume (27.6 cm diameter by 75 cm long). In such an example, the rectangular volume enclosing these cylinders would provide 29× more water storage than the internal hydrogen storage on a mass basis for hydrogen storage at 250 bar pressure. Such water storage capacity exceeds the illustrated 20× the mass of stored hydrogen, if all of the heat rejection is handled by water vaporization, for an average cell operation of 0.75 volts.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A method of managing heat from an engine for a vehicle, the method comprising:
   providing airflow over a surface of a heat exchanger circulating coolant used to cool the engine, said airflow rejects heat front the heat exchanger;
   wicking water over the heat exchanger to supplement the cooling capacity of the airflow by evaporative cooling; and
   condensing vapor exhaust of the engine to provide at least a portion of the water.

2. The method according to claim 1 further comprises supplying the water from a water storage volume provided by void spaces around fuel storage tanks of the vehicle.

3. The method according to claim 1, wherein the water is used to supplement cooling of the heat exchanger under peak power and/or hot day conditions when the cooling capacity of the heat exchanger is not sufficient.

4. The method according to claim 1, further comprises using exhaust gases or coolant flow from the engine under sub-zero ambient temperatures to provide heat to at least a portion of a water storage volume holding the water and to supply lines supplying the water to the heat exchanger.

5. The method according to claim 1 further comprises providing the water over the heat exchanger when the cooling capacity of the airflow needs to be supplemented.

6. The method according to claim 1, wherein the vapor exhaust is condensed and stored during low power and/or cold day conditions when the cooling capacity of the heat exchanger is more than adequate in order to provide a supply of the water when the cooling capacity of the airflow needs to be supplemented.

7. The method according to claim 1 wherein at least a portion of the vapor exhaust is directed through a condenser when the heat exchanger has excess capacity.

8. The method according to claim 1 wherein the engine is an electrochemical engine.

9. The method according to claim 1 further comprises supplying the water to forward and rearward wicking mechanism portions of the heat exchanger during warm weather conditions and to only the rearward wicking mechanism portion during near freezing weather conditions and below.

10. The method according to claim 1 further comprises supplying the water from a water storage volume provided by void spaces defined in substantially rectangular volumes surrounding substantially cylindrical fuel storage tanks of the vehicle.

11. The method according to claim 1, wherein the water is wicked over the heat exchanger by providing a supply of water in fluid connection with a wicking mechanism.

12. The method according to claim 1, furthering comprising spraying at least a portion of the water on the heat exchanger.

13. A thermal management system of an engine for a vehicle, comprising:
    a coolant pump;
    a radiator comprising a wicking mechanism and having an associated fan to provide airflow over the wicking mechanism;
    a coolant circuit circulating coolant used to cool the engine, said coolant circuit fluidly connecting the engine, the coolant pump, and the radiator;
    a supply of water in fluid connection with the wicking mechanism to supplement the cooling capacity of the airflow by evaporative cooling; and
    a condenser to condense water from vapor exhaust of the engine to provide at least a portion of the supply of water.

14. The thermal management system according to claim 13, wherein said supply of water is from a water storage volume provided by void spaces around fuel storage tanks of the vehicle.

15. The thermal management system according to claim 13, wherein the supply of water is used to supplement cooling of the heat exchanger under peak power and/or hot day conditions when the cooling capacity of the heat exchanger is not sufficient.

16. The thermal management system according to claim 13, wherein exhaust gases or coolant flow from the engine are operatively directed under sub-zero ambient temperatures to provide heat to at least a portion of the supply of water and to supply lines supplying water to the wicking structure.

17. The thermal management system according to claim 13, wherein the engine is an electrochemical engine, and at least a portion of a vapor exhaust of the electrochemical engine is operatively directed through the condenser for condensing water to provide the supply of water when the radiator has excess capacity.

18. The thermal management system according to claim 13, wherein the wicking mechanism is provided at a portion of die radiator away from an air receiving side of the radiator, and in a region which experiences above freezing temperatures (i.e., $>0°$ C.) during normal operating conditions of the engine when the vehicle is subject to a freezing ambient temperature.

19. The thermal management system according to claim 13, wherein the wicking mechanism is provided at forward and rearward portions of the radiator, the forward portion being on an air receiving side of the radiator, and the rearward portion being away from the air receiving side of the radiator and in a region which experiences above freezing temperatures during normal operating conditions of the engine when the vehicle is subject to a freezing ambient temperature.

20. The thermal management system according to claim 19, wherein the supply of water is operatively directed to the wicking mechanism of the forward and rearward portions of the radiator during warm weather conditions and to only the wicking mechanism on the rearward portion of the radiator during near freezing weather conditions and below.

21. The thermal management system according to claim 13, wherein said water storage volume is provided by void spaces defined in substantially rectangular volumes surrounding substantially cylindrical fuel storage tanks of the vehicle.

22. The thermal management system according to claim 13, wherein said supply of water is from a water storage volume provided by void spaces round hydrogen storage tanks in a rear underbody compartment of the vehicle forward of a rear axle of the vehicle.

23. The thermal management system according to claim 13, wherein said wicking mechanism is selected from the group consisting of wicking fibers, wicking felts, wicking polymers, wicking metals, and combinations thereof.

24. The thermal management system according to claim 13, wherein said wicking mechanism is fins of the radiator with a porous surface.

25. The thermal management system according to claim 13, wherein the vehicle includes a fuel cell stack and the coolant circuit is fluidly connecting to the fuel cell stack.

26. The thermal management system according to claim 13, wherein the engine comprises a fuel cell stack and the coolant circuit is fluidly connecting to the fuel cell stack.

27. The thermal management system according to claim 13, wherein at least a portion of the fluid connection between the supply of water and the wicking mechanism is provided by a pump used to spray the water onto the radiator.

* * * * *